United States Patent Office 3,701,683
Patented Oct. 31, 1972

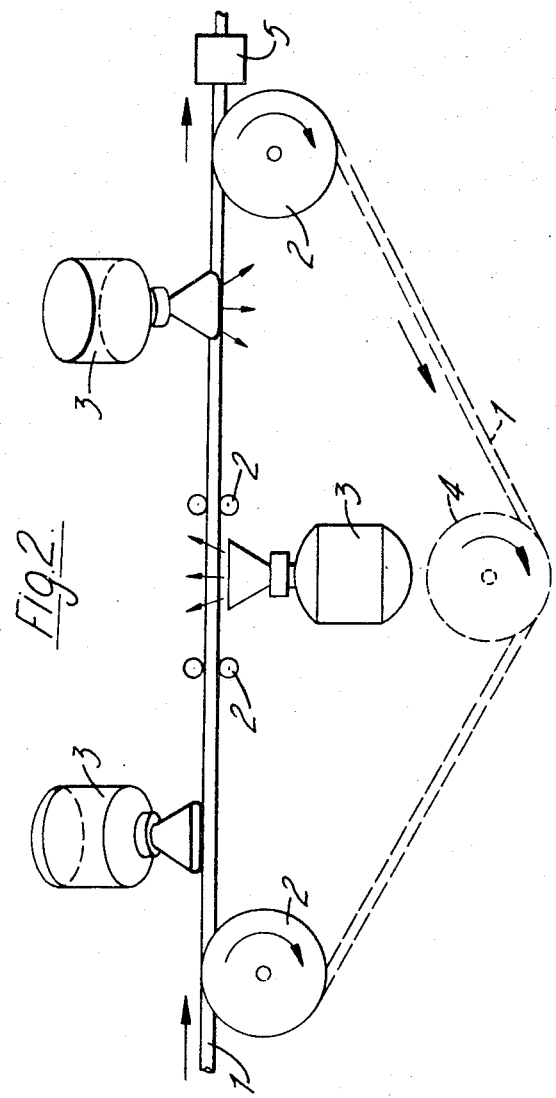

3,701,683
MANUFACTURE OF HIGH VOLTAGE INSULATED ELECTRIC CABLES
Graham Boyce Wills, London, and Frank Stanley Walker, Harpenden, England, assignors to British Insulated Callender's Cables Limited, London, England
Filed Jan. 13, 1971, Ser. No. 106,086
Claims priority, application Great Britain, Jan. 16, 1970, 2,290/70
Int. Cl. B44d 1/50
U.S. Cl. 117—232
5 Claims

ABSTRACT OF THE DISCLOSURE

In the manufacture of a high voltage electric conductor by applying to a metallic conductor an insulating covering of an ethylene polymer at least 2.5 mm. thick and subjecting the covering to high energy radiation, the insulating covering is caused to absorb a dose D mrad in the range 20–60 mrad (preferably 25–55 mrad) at an average rate R mrad/sec. such that $$R \geq e^{0.046(D-10)}$$

Figure 1:
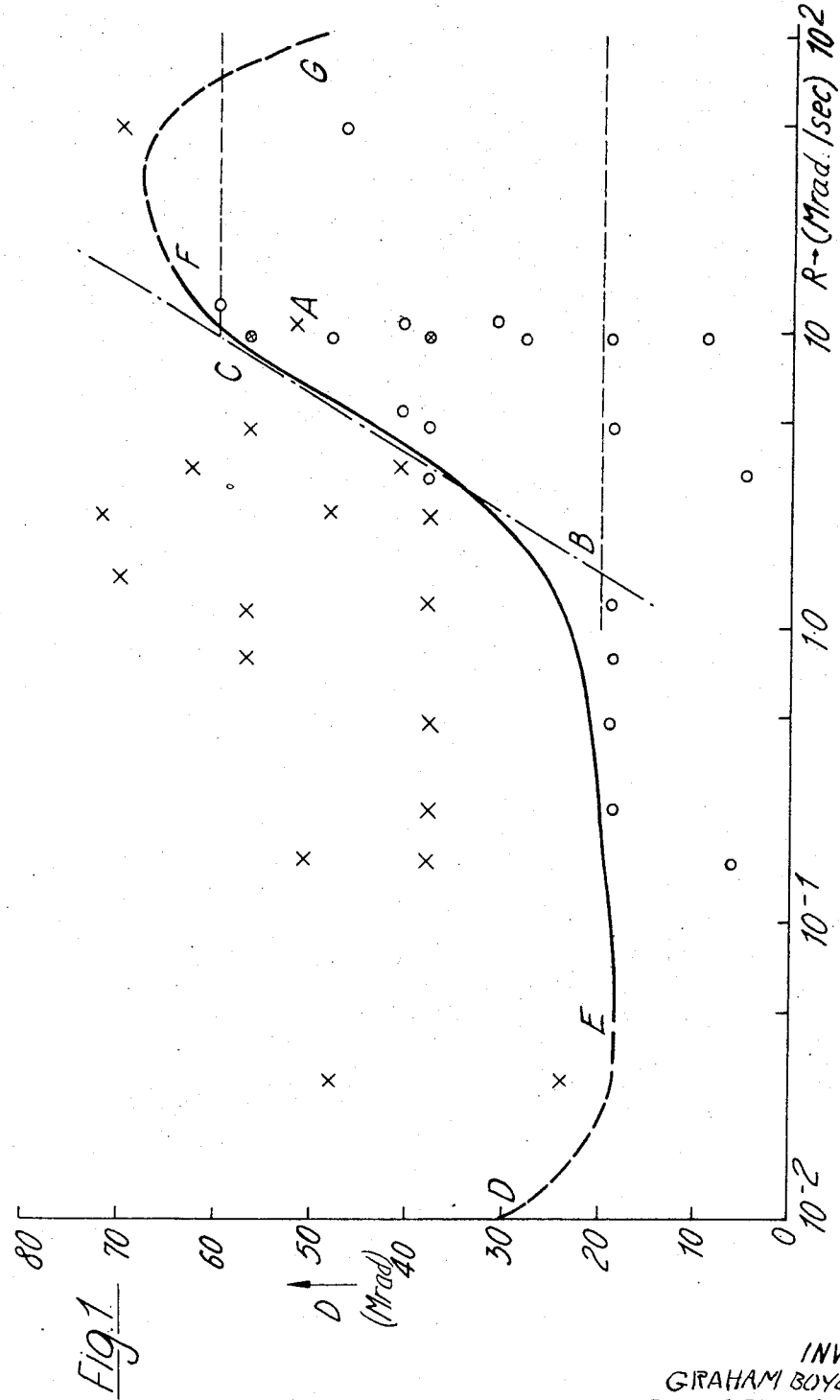

Irradiation with high energy electrons is preferred.

---

This invention relates to the manufacture of high voltage electric conductors having insulation of ethylene polymers, by which is meant either polymers derived solely from ethylene or polymers derived from a major proportion of ethylene and a minor proportion of one or more than one comonomer that has no substantial effect upon the tensile strength, electrical properties, or radiation sensitivity of the polymer.

It is now well known that certain physical properties of some polymeric materials, notably tensile strength and heat distortion temperature, can be improved by cross-linking by high energy irradiation, and the Complete Specification of U.K. Patent No. 766,802 describes the application of such irradiation to the production of improved insulated wires and cables.

This process has proved entirely satisfactory in the treatment of wires having a thin coating of polyethylene, but difficulties arise if the thickness of the coating exceeds 2.5 mm. (corresponding to a service voltage of around 6 kv.). When polymeric material is extruded onto a cable conductor, there is a risk that voids may be formed in the material and such voids may ultimately lead to electrical breakdown of the cable in service. As a precaution against the presence of voids of significant dimensions it is usual to require that the cable should be subjected to a corona inception test, and that the corona inception voltage (C.I.V.) should exceed a prescribed value, which may for example be about twice the working voltage of the cable. (The corona inception voltage is the minimum voltage between the cable conductor and a surrounding annular electrode that produce a detectable degree of electromagnetic noise generation; the actual numerical values obtained are of little significance, since they depend upon the design of the test apparatus, but generally it is found that for cables containing voids a very much lower value is obtained.)

When cables insulated with 2.5 mm. or more of an ethylene polymer have been subjected to irradiation to crosslink the polymeric material using a radiation dose in the range 20–60 mrad and have been subjected shortly afterwards to a C.I.V. test, the failure rate has been excessively high. The reason for this is not understood, but it may possibly be connected with the production in the polymer of localised regions of high electric charge of low mobility.

It seems possible that this difficulty could be largely overcome by storing the cable core before testing for a period of time that increases rapidly with the thickness of the insulating material and is around a month for thicknesses just over 2.5 mm.; this is not, however, a practical solution to the problem as it would so increase the capital employed that the whole process would become uneconomic compared with the use of chemical cross-linking agents.

Another possibility is to heat the material after irradiation for a relatively short period at a temperature above the crystalline melting point. This is effective in reducing the incidence of spurious failure indications but is unsatisfactory because the frequency of actual voids is increased, presumably because the reduction in tensile strength at the elevated temperature allows the formation of voids by separation of dissolved gas formed in the material by the irradiation process.

It has now been discovered that the difficulties described can be substantially avoided and a meaningful C.I.V. test carried out immediately after irradiation under certain circumstances by carrying out the irradiation in a shorter period than hitherto.

In accordance with the invention, a method of manufacturing a high voltage electric conductor comprises applying to a metallic conductor an insulating covering of an ethylene polymer at least 2.5 mm. thick and subjecting the covering to high-energy radiation to cause it to absorb a dose D mrad in the range 20–60 mrad at an average dose rate R mrad/sec. such that $$R \geq e^{0.046(D-10)}$$

Throughout this specification the term "dose" means the average dose integrated over the whole of the dielectric.

The total dose is preferably between 25 and 55 mrad. Irradiation with high energy electron, that is electrons having an energy of at least 0.8 mev. is preferred. The dose is preferably given in a single exposure to radiation of uniform intensity but a non-uniform intensity can be used or the dose can be built up from a number of separate exposures: however in such cases the mean dose rate R as specified by the above formula is always equal to the dose divided by the total time from the beginning of the first exposure to the radiation to the end of the final exposure, that is including standing time between exposures.

In the accompanying drawings:

FIG. 1 is a graph showing experimental results which illustrate the invention, and FIG. 2 is a diagram of apparatus for carrying out the process in accordance with the invention.

In FIG. 1, which is a graph of dose D in megarads against average dose rate R in megarads per second, each of the points represents a separate sample. An open circle indicates a sample that had immediately after irradiation a C.I.V. of 35 kv. or higher on a particular test apparatus; a ringed cross a sample with a C.I.V. equal to 35 kv. within experimental uncertainty, and a plain cross a sample having a C.I.V. lower (in fact always much lower) than 35 kv. All the samples had a dielectric 4 mm. thick of a polymer derived from ethylene only.

It will be observed that irradiation under process conditions corresponding to points above and to the left of the curve in FIG. 1 almost always leads to failure of the C.I.V. test on this criterion, whereas below and to the right of the line failure is exceptional: the only clear failure in this region (point A) was a sample that showed no sign of recovery after several months, and therefore appears to have been actually defective. Many, but by no means all, of the other "failed" samples showed signs of recovery after about a month.

In the dose range of practical interest, namely 20–60 mrad, the borderline curve coincides within experimental error with the straight line B–C representing the relationship $$R \geq e^{0.046(D-10)}$$

This relationship does not vary materially within the insulation thickness range of practical interest (say up to 25 mm.).

The dotted portions of the curve of FIG. 1 are purely theoretical. D–E is based on the expectation that the difficulties described would be of reduced or negligible significance if the irradiation process were carried out over a period of time long compared with the times taken for internal charges to decay and for evolved gas to diffuse out of the insulating material; F–G represents the onset of direct damage through the combination of high temperature and high internal gas pressure: it is possible that, as indicated, this curve falls below 60 mrad for very high dose rates, but this is of no practical importance since the range of irradiation conditions concerned is one that would not be utilised because it would involve an unnecessarily great capital investment.

FIG. 2 of the drawings shows in diagrammatic form apparatus suitable for carrying out the process of the invention. The cable or other insulated conductor 1 is taken from a supply drum or direct from the extruder that applied the insulating coating thereto (not shown) and is passed by means of guides 2 through the irradiation zones of three electron accelerators 3 which are set at angles of 120° to one another as viewed in the direction of the cable axis. If necessary a further pass can be arranged using one or more further guides 4. After completion of irradiation the cable may be passed directly to a C.I.V. test station 5 and thence to a take-up arrangement (not shown).

Although scanning electron accelerators have been shown for the purpose of illustration, it is to be understood that we do not intend to exclude the use of other types of accelerator, such as the linear filament and "coaxial" types; however we do not believe that these two types of accelerator are yet commercially viable at the particle energies required for the present invention (say 0.8 to 6 mev.).

What we claim as our invention is:

1. A method of manufacturing a high voltage electric conductor comprising applying to a metallic conductor an insulating covering of an ethylene polymer at least 2.5 mm. thick and subjecting said covering to high energy radiation to cause it to absorb a dose D mrad in the range 20–60 mrad at an average rate R mrad/sec. such that $$R \geq e^{0.046(D-10)}$$

2. A method in accordance with claim 1 wherein the said dose D is in the range 25–55 mrad.

3. A method in accordance with claim 1 wherein said high energy radiation consists of electrons having an energy of at least 0.8 mev.

4. A method of manufacturing a high voltage electric conductor comprising applying to a metallic conductor an insulating covering of an ethylene polymer at least 2.5 mm. thick and subjecting said covering to high energy radiation to cause it to absorb a dose D mrad in the range 20–60 mrad at an average rate R mrad/sec. such that the irradiation conditions are represented by a point on FIG. 1 of the accompanying drawings below the curve ECFG.

5. A method in accordance with claim 4 wherein said high energy radiation consists of electrons having an energy of at least 0.8 mev.

References Cited
UNITED STATES PATENTS

| | | | |
|---|---|---|---|
| 2,877,500 | 3/1959 | Rainer et al. | 117—93.31 |
| 2,929,744 | 3/1960 | Mathes et al. | 117—93.31 |

ALFRED L. LEVITT, Primary Examiner

J. H. NEWSOME, Assistant Examiner

U.S. Cl. X.R.

117—93.31, 128.4; 250—49.5 TE